US008779353B2

(12) United States Patent
Zanon et al.

(10) Patent No.: US 8,779,353 B2
(45) Date of Patent: Jul. 15, 2014

(54) ION GUIDE AND ELECTRODE FOR ITS ASSEMBLY

(75) Inventors: Stephen Zanon, Campbell, CA (US); Maurizio A. Splendore, Walnut Creek, CA (US)

(73) Assignee: Bruker Daltonics, Inc., Billerica, MA (US)

( * ) Notice: Subject to any disclaimer, the term of this patent is extended or adjusted under 35 U.S.C. 154(b) by 160 days.

(21) Appl. No.: 13/347,754

(22) Filed: Jan. 11, 2012

(65) Prior Publication Data

US 2013/0175441 A1 Jul. 11, 2013

(51) Int. Cl.
*H01J 3/14* (2006.01)
*B01D 59/44* (2006.01)

(52) U.S. Cl.
USPC ........... 250/281; 250/282; 250/283; 250/286; 250/290

(58) Field of Classification Search
USPC .............. 250/288, 287, 292, 281, 423 R, 282
See application file for complete search history.

(56) References Cited

U.S. PATENT DOCUMENTS

| | | | | |
|---|---|---|---|---|
| 4,963,736 | A | 10/1990 | Douglas | |
| 6,107,628 | A | 8/2000 | Smith | |
| 6,730,904 | B1 * | 5/2004 | Wells | 250/292 |
| 6,891,153 | B2 | 5/2005 | Bateman | |
| 7,164,122 | B2 * | 1/2007 | Fuhrer et al. | 250/287 |
| 7,391,021 | B2 * | 6/2008 | Stoermer et al. | 250/292 |
| 7,514,673 | B2 * | 4/2009 | Senko et al. | 250/281 |
| 7,595,486 | B2 * | 9/2009 | Franzen | 250/288 |
| 7,851,752 | B2 | 12/2010 | Kim et al. | |
| 7,960,693 | B2 | 6/2011 | Syms | |
| 2005/0121772 | A1 | 6/2005 | Hayashi et al. | |
| 2005/0189486 | A1 * | 9/2005 | Fuhrer et al. | 250/287 |
| 2009/0045062 | A1 * | 2/2009 | Senko et al. | 204/547 |
| 2012/0161029 | A1 * | 6/2012 | Makarov et al. | 250/396 R |
| 2012/0267526 | A1 * | 10/2012 | Green | 250/290 |

FOREIGN PATENT DOCUMENTS

| | | | |
|---|---|---|---|
| GB | 2370686 | A1 | 7/2002 |
| GB | 2428514 | A1 | 1/2007 |
| GB | 2451239 | A1 | 1/2009 |

* cited by examiner

*Primary Examiner* — Nikita Wells
*Assistant Examiner* — Johnnie L Smith
(74) *Attorney, Agent, or Firm* — Robic, LLP

(57) ABSTRACT

An ion guide that transports ions from an ion source at generally a high-pressure level to a mass analyzer at generally a low-pressure level has a plurality of identical electrodes fabricated with protruding elements that forming an ion tunnel or an ion funnel, when the electrodes are assembled around a common longitudinal axis. The protruding elements allow the generation of the radio frequency field necessary to radially confine ions. Each electrode may be machined from a solid block of conductive material, such as metal. The disclosed arrangement greatly simplifies the manufacturing process, reducing cost, and improving robustness and reliability of the ion guide itself.

19 Claims, 8 Drawing Sheets

ION GUIDE AND ELECTRODE FOR ITS ASSEMBLY

BACKGROUND

This application is in the field of mass spectrometry and, more specifically, relates to ion guides to be used advantageously at interfaces between a high-pressure region and a low-pressure region. Mass spectrometers can be used to determine the molecular weight of gaseous compounds. The analysis of samples by mass spectrometry consists of three main steps, formation of gas phase ions from sample material, mass analysis of the ions to separate the ions from one another according to ion mass to charge ratio m/z, and detection of the ions. A variety of well-known means and methods exist in the field of mass spectrometry to perform each of these three functions. The particular combination of the means and methods used in a given mass spectrometer determine the characteristics of that instrument.

Before mass analysis can begin, gas phase ions must be formed from a sample material. If the sample material is sufficiently volatile, ions may be formed by electron ionization (EI) or chemical ionization (CI) of the gas phase sample molecules, for instance.

Atmospheric Pressure Ionization (API) includes a number of ion production means and methods. Typically, analyte ions are produced from liquid solution at atmospheric pressure. In one of the more widely used methods known as electrospray ionization (ESI), analyte is dissolved in a liquid solution and sprayed from a needle. The spray is induced by the application of a potential difference between the needle and a counter electrode. The spray results in the formation of fine, charged droplets of solution containing analyte molecules. In the gas phase, the solvent evaporates leaving behind charged gaseous analyte ions.

In addition to ESI, other ion production methods may be used at atmospheric or elevated pressure. For example, matrix-assisted laser desorption/ionization (MALDI) has been adapted to work at atmospheric pressure. The benefit of adapting ion sources in this manner generally is that the ion optics (that is, the electrode structure and operation) in the mass analyzer and mass spectral results obtained are largely independent of the ion production method used.

In hybrid analytical instruments, such as liquid chromatography/mass spectrometry (LC/MS) instruments, where two analytical techniques are coupled and the liquid output of one serves as the analytical input of the other, it is preferred to generate ions in an ion source which is maintained at (or near) atmospheric pressure.

Elevated pressure (that is, elevated relative to the pressure of the mass analyzer) and atmospheric pressure ion sources always have an ion production region wherein ions are produced, and an ion transfer region wherein ions are transferred through differential pumping stages into the mass analyzer. Generally, mass analyzers operate in a vacuum between $10^{-2}$ and $10^{-8}$ Pascal depending on the type of mass analyzer used. When using, for example, an ESI or elevated pressure MALDI source, ions are formed and initially reside in a high pressure region of "carrier" gas. In order for the gas phase ions to enter the mass analyzer, the ions must be separated from the carrier gas and transported through the single or multiple vacuum stages.

The use of multipole ion guides has been shown to be an effective means of transporting ions through a vacuum system, see for example U.S. Pat. No. 4,963,736 to Douglas et al. Under the generic name of "ion guide" different electrical devices are used, such as quadrupole, hexapole or octopole rod systems, but also stacked ring electrodes (see, for instance, U.S. Pat. No. 6,891,153 B2 to Bateman et al.). The function of the ion guides is to confine and transfer the ion beam throughout the intermediate vacuum stages via a radio frequency (RF) field generated by the guide itself. The normal operating pressure of such ion guides ranges from about 100 to 10,000 Pascal. A novel way of micro-engineering stacked ring ion guides has been presented recently by Syms et al. (U.S. Pat. No. 7,960,693 B2).

One of the principal differences between multipole rod ion guides and stacked ring electrode ion guides is the manner of electrical wiring, or in other words the electrical contacting. Rod ion guides conventionally comprise an even number of elongated pole rods arranged around a longitudinal axis under rotational symmetry. The wiring is (or in other words, the electrical contacts are arranged) normally such that two opposing rods receive the same phase of a radio frequency potential whereas other pairs of opposing rods receive different phases of the same RF potential. In other words, the pole rods receive different phases of an RF potential in a "crosswise" manner.

On the other hand, stacked ring ion guides are wired such that, along the row of rings, adjacent rings receive alternating phases (normally, 180 degrees out of phase) of an RF potential. In other words, the stacked ring electrodes receive different phases of an RF potential in an "axially alternating" manner. As a result, stacked ring ion guides generally have a narrow range of effective geometries. That is, the thickness of the rings and the gap between the rings must be relatively small compared to the size of the inner aperture of the ring. Otherwise, ions may get trapped in pseudopotential "wells" in the ion guide and therefore not be efficiently transmitted.

Another means for guiding ions at "near atmospheric" pressures (that is, pressures between about 10 and $10^5$ Pascal) is disclosed by Smith et al. (U.S. Pat. No. 6,107,628 A). One embodiment consists of a row of rings the inner apertures of which gradually decrease along the row. Thus the aggregate of the apertures form a "funnel" shape, otherwise known as an ion funnel. The ion funnel has an entry corresponding with the largest aperture, and an exit corresponding with the smallest aperture. The row of rings is wired in the axially alternating manner as mentioned before. Further, a direct current (DC) electrical gradient is created using a power supply and a resistor chain to supply the desired and sufficient voltage to each ring to create a driving force for ions to be transported through the funnel. Additional driving forces may be necessary with ion funnels since the pseudopotentials created therein, due to the tapering aperture of the rings, could otherwise be ion repulsive along the axis.

Generally, the ion funnel has the advantage, when properly operated, that it can efficiently transmit ions through a relatively high pressure region (that is, larger than about 10 Pascal) of a vacuum system, whereas multipole ion guides perform poorly at such pressures. However, the ion funnel generally performs poorly at lower pressures where multipole ion guides transmit ions efficiently.

FIG. 1 shows an exemplary mass spectrometer arrangement according to prior art. On the left it has an ion source with an ion source housing 6 which, in this case, is equipped with an electrospray capillary 4 protruding into the ion source housing 6 and being supplied with a sample solution by reservoir 2. Opposite to the spray capillary 4, the ion source housing 6 has a waste or exhaust port 8 through which superfluous solvent mist is removed. The ion source housing 6 is coupled to a mass spectrometer assembly having four differential pumping chambers 30, 32, 34 and 36. The pressure in these pumping chambers 30, 32, 34 and 36, by way of example, can amount to 300, 3, 0.03, and $3\times10^{-4}$ Pascal, respectively. The pressures in the pumping stages 30, 32, 34 and 36 are set and maintained by vacuum pumps 31, 33, 35 and 37. The first vacuum chamber 30 has an inlet capillary 10 in an off-axis position which, on the ion source housing side, receives ions from the sample solution injected into the ion source housing 6. The off-axis position of inlet capillary 10 is useful as it prevents droplets from flying directly through the device to the ion detector 48.

The other side of the inlet capillary 10 is opposite a stacked ring ion funnel 16 as known, for example, from the aforementioned disclosure by Smith et al. The ion funnel 16 is connected to an RF+DC voltage generation network 12, 14 which supplies RF voltages to the individual rings with axially alternating phase so that pseudopotentials necessary for radial confinement can be created. The separate electrodes of the stacked ring ion funnel 16 can also be supplied with a DC potential gradient along the axis in order to provide additional driving force acting on the ions to drive them through the funnel 16. With the largest aperture ring electrode facing the outlet of the inlet capillary 10 and the smallest aperture ring electrode facing an insulated orifice plate 50 at the interface to the next differential pumping chamber 32, which allows the generation of a potential drop along the ion pathway, the stacked ring ion funnel 16 has a large acceptance profile for ions passing the inlet capillary 10 and, along its axis by means of its tapering aperture, promotes radial focusing so that, upon exiting the funnel 16, the outer dimension of the ion stream is small enough to pass the insulated orifice plate 50 without much ion loss.

The vacuum chambers 32, 34 downstream of the vacuum chamber 30 with the ion funnel 16 may then each have a quadrupole rod ion guide 42, 44 as known from the aforementioned disclosure of Douglas et al., for instance, as well as further insulated orifice plates 52 and 54 at the downstream interfaces, respectively. Due to the radial focusing of the ions in the ion funnel 16 the rod ion guides 42, 44 are well suited to transfer the ions further without significant ion loss. The last vacuum chamber 36 in this example then has a quadrupole rod mass filter 46 as is well known in the art. By applying appropriate RF and DC voltages to the pole rods of the mass filter 46 a window of mass to charge ratios m/z can be set, or a range of corresponding windows can be scanned through, to allow ions having the respective mass to charge ratio m/z to pass the mass filter 46 and reach the ion detector 48 where they can be measured as a function of the voltage conditions applied.

Recently, Kim et al. (U.S. Pat. No. 7,851,752 B2 which is incorporated by reference in its entirety in the present disclosure) proposed a new ion guide design which encompasses the features of a cross-wise wiring and an axially alternating wiring at the same time. The design includes segmenting each ring (or electrode) in a conventional stacked ring ion guide design into a number of electrically conductive regions separated from each other by insulating regions, and supplying the electrically conductive regions of each electrode, as known from multipole rod ion guides, in a cross-wise manner while also, as known from stacked ring ion guides, providing axially alternating phase differences between electrically conductive regions of adjacent electrodes in the row, which are aligned with each other. Thereby, in particular, the presence of undesired trapping pseudopotential wells between adjacent electrodes in the stack is supposed to be overcome. However, the assembly of Kim's ion guide turns out to be rather cumbersome as it is suggested to provide ring-shaped electrically insulating supports to which metal foils are bonded in the areas designated for the electrically conductive regions. All these electrically conductive regions then have to be wired according to the desired electrical circuitry. This procedure is rather time consuming as every single electrode in the stack has to be machined individually.

In view of the above a need exists to provide an ion guide that includes the favorable combined wiring in an axially alternating as well as a cross-wise manner while, in particular, being easier to fabricate and assemble.

SUMMARY

In accordance with the principles of the invention, a radio frequency ion guide comprises a plurality of electrodes, each of which has at least one row of elements protruding from a holder, each of the protruding elements, at a distal end, having an electrically conductive aperture contour forming portion. Upon assembly of the electrodes, the rows of protruding elements cooperate to form a row of substantially plane segmented aperture members, each of the segmented aperture members having a plurality of insulating gaps located between cooperating protruding elements, and a central aperture defined by cooperating aperture contour forming portions. The disclosed radio frequency ion guide design greatly simplifies the manufacturing process, reducing cost, and improving robustness and reliability of the ion guide itself.

In various embodiments, a dimension of the aperture contour forming portion generally changes along the at least one row of protruding elements in each of the plurality of electrodes, such that, when the rows of protruding elements of different electrodes cooperate, a dimension of the central aperture generally decreases along the row of segmented aperture members to form an ion funnel.

In various embodiments, the electrodes at one of their respective ends comprise attachment plates, via which they are coupled to a support plate.

In further embodiments, the holder comprises a plurality of pumping apertures in each of the plurality of electrodes. The holder may take the form of a back plate.

In some embodiments, each row of protruding elements comprises a first protruding element, a last protruding element, and a group of intermediate protruding elements, wherein in each of the plurality of electrodes the holder and at least the group of intermediate protruding elements are machined integrally from a single piece of conductive material. Apart from simplifying the electrical wiring, an integral design also allows for the parts of the electrode to be simultaneously heated. Heating may prevent durable deposition of substances which could promote undesirable electrostatic charging or deleterious outgassing. Furthermore, modern machining techniques allow for the features of the electrodes to be machined in one clamping of the workpiece, so that geometrical tolerances among the different features of an electrode can be kept at a minimum.

In some embodiments, the first protruding element and the last protruding element are attached to the holder in an insulating manner and separately supplied with RF and DC potentials.

Preferably, the plurality of protruding elements are arranged in two parallel rows on the holder in each of the plurality of electrodes, wherein one row is shifted spatially in an axial direction, such that the protruding elements in one row are located, in particular centrally, across a space between two protruding elements in the other row.

In various embodiments, the protruding elements of each segmented aperture member cooperate to form opposing pairs, the opposing pairs being configured to receive different phases of a radio frequency potential.

In further embodiments, the protruding elements of the segmented aperture members are substantially aligned along a common axis along the row, each protruding element in one segmented aperture member receiving a different phase of radio frequency potential than the protruding elements in adjacent segmented aperture members aligned therewith.

Favorably, all electrodes are identical and assembled around a common longitudinal axis under rotational symmetry.

In a second aspect, the invention relates to an apparatus for performing mass spectrometry, comprising an ion source, a mass analyzer, and an ion guide as herein before specified. The ion guide has an inlet end coupled to the ion source and an outlet end coupled to the mass analyzer, and is configured for guiding ions from the ion source to the mass analyzer. The ion source is maintained at a pressure higher than the mass analyzer. If the ion guide is configured as an ion funnel, the large aperture end advantageously faces the ion source and the small aperture end faces the mass analyzer.

In a third aspect, the invention relates to an electrode for an ion guide, comprising a plurality of protruding elements extending in at least two adjacent rows from a holder, each of the rows having a first protruding element, a last protruding element, and a group of intermediate protruding elements. Each of the protruding elements, at a distal end, has an electrically conductive aperture contour forming portion, and the holder and at least the group of intermediate protruding elements are machined integrally from a single piece of conductive material, such as metal.

In various embodiments, the first protruding element, the last protruding element, and the group of intermediate protruding elements in each row together with the holder are machined integrally from a single piece of conductive material.

In some embodiments, however, the first protruding element and the last protruding element are attached to the holder in an insulating manner.

In further embodiments, the protruding elements have the shape of fins, and the aperture contour forming portion is a recessed outer contour portion at a distal end of the fins.

Preferably, the holder is a back plate. The back plate may comprise a plurality of pumping apertures.

In various embodiments, the plurality of protruding elements is surface treated to provide chemical resistance.

BRIEF DESCRIPTION OF THE DRAWINGS

Other aspects and features of the invention would be apparent from the detailed description, which is made with reference to the following drawings. It should be appreciated that the detailed description and the drawings (often schematically) provides various non-limiting examples of various embodiments of the invention, which is defined by the appended claims.

DETAILED DESCRIPTION

Figure 2B:
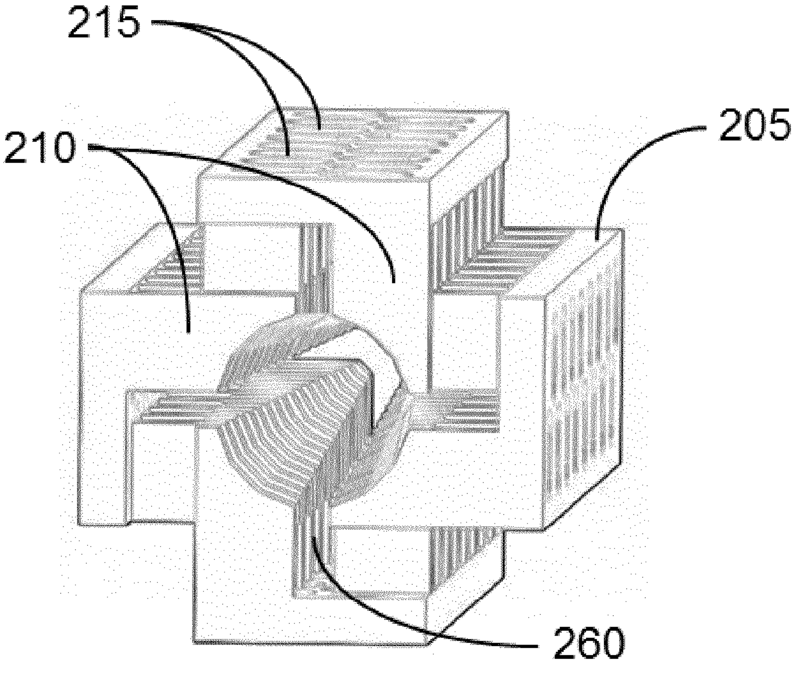
FIGS. 2B and 2C are perspective views showing an ion guide according to an embodiment of the invention, assembled using four machined parts shown in FIG. 2A.
Figure 2A:
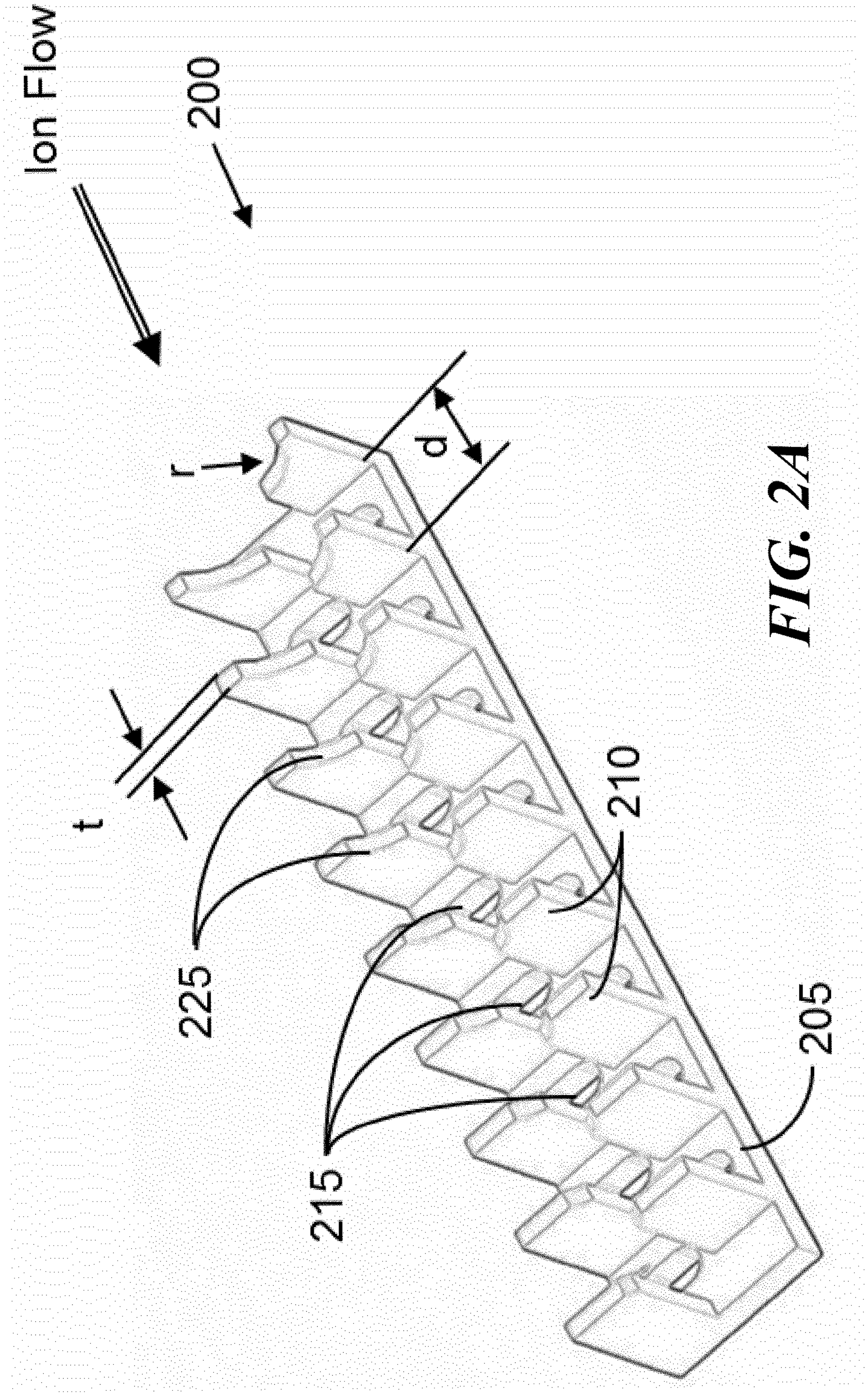
FIG. 2A is a perspective view of a machined part for forming an ion guide with tapered aperture according to an embodiment of the invention.
Figure 2C:
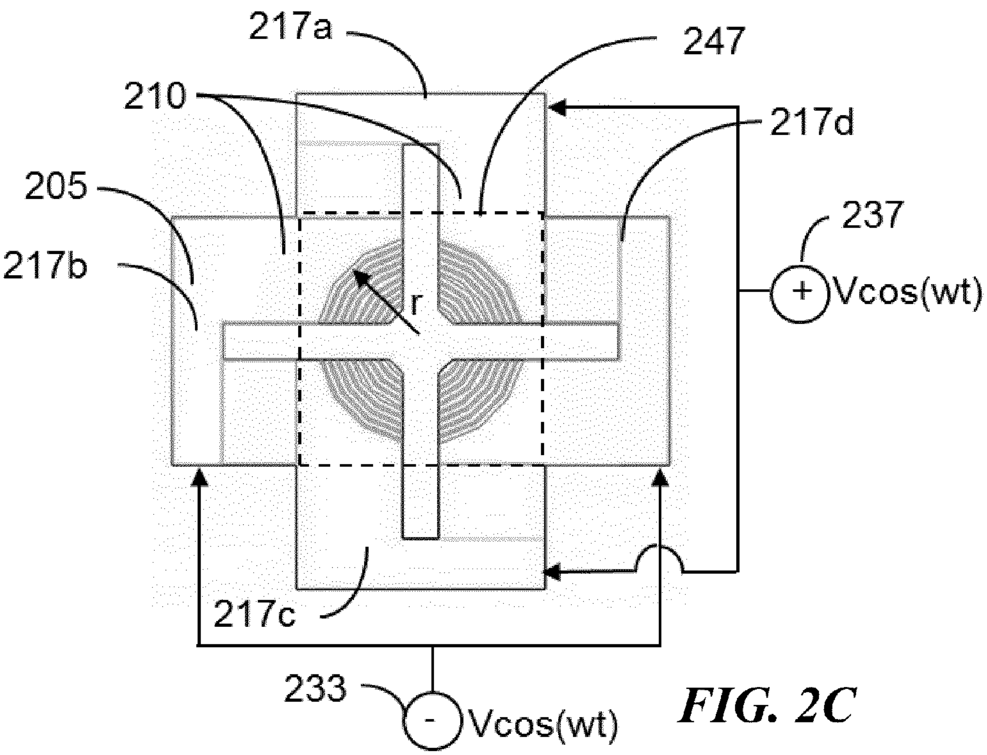

Embodiments of the invention provide an ion funnel that transfers ions from an ion source to a mass analyzer. An embodiment is illustrated in FIG. 2A-C. This embodiment consists of four identical electrodes machined from a solid block and disposed around a common axis, which is an axis of propagation of the ion beam. One such machined electrode 200 is illustrated in FIG. 2A. Each of the four electrodes 200 comprises a holder in the form of a back plate 205, which may have a plurality of openings 215 to allow for lateral vacuum pumping. The electrode 200 also comprises a plurality of machined features, such as protruding fins 210, which allow the generation of the necessary multipolar radio frequency field. In this embodiment the back plate 205 and all the fins 210 are machined from one block of conductive material. In other embodiments, the fins 210 can be manufactured separately and then attached to the back plate 205 by means such as weld, conductive adhesive, sintering, screws, etc. The spacing, shape, and thickness of the fins 210 co-define the radio frequency field and can be easily build into one single electrode. Generally, it is favorable to limit the dimensions of the fins 210 to a (practicable) minimum in order to also minimize capacitance.

As shown in the example of FIG. 2A-C, two rows of fins 210 emanate from the back plate 205. Each of the fins 210 is generally rectangular, with a recessed outer contour portion here in the form of an arcuate cut 225 in one corner (the corner being adjacent to an axis of ion flow). The arcuate cut 225 generally approximates a circle segment. The radius of the arcuate cut, indicated by the arrow marked "r" in FIG. 2A and 2C, decreases from one fin to the next in the axial direction. Preferably, the centers of the radii of the circle segments, upon assembly of the electrodes 200, coincide with an axis of ion flow in the ion guide. The fin that is positioned closest to the ion source (to the upper right in FIG. 2A) has the largest cut, while the fin that is closest to the mass analyzer (to the lower left in FIG. 2A) has the smallest cut. Thus, when assembled with complementary electrodes, as shown in FIG. 2B-C, the arcuate cuts form a funnel shape having a large central opening proximate the ion source and a small central opening proximate the mass analyzer. In FIG. 2B-C, the assembled funnel is illustrated with the large central opening facing the reader, that is, showing the side that will be assembled facing the ion source. Therefore, the fins 210 fully visible to the reader in FIG. 2B-C have the largest radius cut.

In the particular example of FIG. 2A-C, in each row the fins 210 are spaced from each other a distance "d", which equals the thickness "t" plus twice the separation distance between assembled plane segmented aperture members (to be explained below) when the ion funnel is assembled. This separation enables a complementary fin from a complementary electrode to nest between two fins of another electrode, as shown in FIG. 2B. The number of fins, the thickness "t" of each fin, distance "d" between the fins, and radius "r" of the arcuate cut, are designed to impart the proper confining field to transfer the ions from the ion source to the mass analyzer. It should be appreciated, however, that the distance "d" need not be limited as described above. In this embodiment it provides for an even spacing of the fins and having nested fins as illustrated in FIG. 2A-C.

As illustrated in FIG. 2A, the fins are arranged in two rows, wherein one row is shifted spatially in the axial direction, such that the fins in one row are centered across the space between two fins in the other row. This enables the "nesting" of the fins from the electrodes that form the funnel, such that the fins nest together to form plane segmented aperture members, which, when energized by the RF power source simultaneously in a cross-wise as well as an axially alternating manner, generate a confinement field required to transport the ions. In FIG. 2C the first plane segmented aperture member, which can be called a segmented transfer plate in this embodiment, is indicated by the broken-line square labeled 247. As can be seen from FIG. 2B, each of the segmented transfer plates 247 is not a separate physical element, but rather results from the combination of the fins oriented together to form the plate. Also illustrated in FIG. 2B is how each fin from one electrode is nested within two fins of its complementary electrodes.

From the illustration of FIG. 2B-C it is apparent that, in this embodiment, the transfer plates 247 consist of four fins 210 featuring elongate gaps 260 between them that generally extend in a radial direction. The four gaps 260 between the four fins 210, together with the arcuate cuts 225, form a cross-like aperture with the (gradually decreasing) central aperture of the arcuate cuts 225 being positioned at a crosspoint of the cross-like aperture. The gaps 260 generally guarantee electrical insulation among the different assembled electrodes 200. It is further apparent that the gaps 260 between the segments (or cooperating fins 210 of one segmented transfer plate 247) in the row cooperate to form a channel along an ion flow path from one end of the ion guide to the other end in this example.

The four electrodes are preferably machined with the identical shape of features, that is, identical back plates, fins and cuts. The four identical electrodes are assembled with respect to the features of an adjacent electrode, such that together the fins of the assembled electrodes form plane segmented aperture members with an aperture for ion transfer, wherein each successive aperture member, in the axial direction of the ion guide, has a smaller aperture in this embodiment. However, it is also conceivable to configure the electrodes such that, upon assembly, an "ion tunnel" with substantially constant inner aperture is created.

For the funnel design, it goes without saying that it is not strictly mandatory for each segmented aperture member to have an individual central aperture compared to adjacent segmented aperture members. Designs are also possible, and may result in the same beneficial ion transport and confinement properties, where a certain number of adjacent aperture members, such as two adjacent aperture members, has the same central aperture size, as long as there is an overall gradient of central aperture size along the row of aperture members from the ion source end to the mass analyzer end. Such designs are also envisaged to be encompassed in the scope of the invention.

When assembled, the electrodes are electrically insulated from each other. The electrodes are coupled to power sources in pairs. In the specific example shown in FIG. 2A-C, four electrodes are assembled together, such that each segmented transfer plate is formed by four fins. Such an arrangement is suitable for use with a quadrupole mass spectrometer, such as the one illustrated in FIG. 1. Therefore, in this embodiment the electrodes are coupled in two opposing pairs. As shown in FIG. 2C, one RF pole 233 is coupled to two opposing electrodes (labeled 217*b* and 217*d*) and another phase shifted RF pole 237 (out of phase by 180 degrees) is coupled to the other two opposing electrodes (labeled 217*a* and 217*c*). Notably, in this arrangement where all protruding fins 210 are machined integrally from a block of conductive material, no DC bias is applied to the electrodes.

It is to be noted here that the number, design and arrangement of the optional pumping openings 215 is shown in FIG. 2A-C by way of (a practicable) example only. For instance, it may not be necessary for each space between two neighboring fins 210 in a row to have a pumping opening 215. A smaller number might also suffice.

It should be appreciated that the embodiment of an ion guide shown in FIG. 2A-C may be used with different types of mass analyzers, such as, for example, Time of Flight (TOF), Ion Trap, Magnetic Sector, Ion Cyclotron Resonance (ICR) or Fourier Transform Mass Spectrometer (FTMS). It can also be used in hybrid mass spectrometers where there are more than one mass resolving devices, for example a quadrupole filter and a TOF analyzer operating in the same apparatus (qTOF).

In one example, the ion guide is placed immediately upstream of the inlet of a mass analyzer, but other architectures can be used. For example, in some embodiments there are more than one stage between the ion source and the mass analyzer as exemplified in FIG. 1. Each of these regions may have an ion guide and one or more of these guides may be configured according to embodiments of the invention. Additionally, an ion guide according to embodiments of the invention can also be used at the outlet of the mass analyzer to guide the ions massing through the mass analyzer to other parts of the system, for instance, an ion detector.

Figure 3:
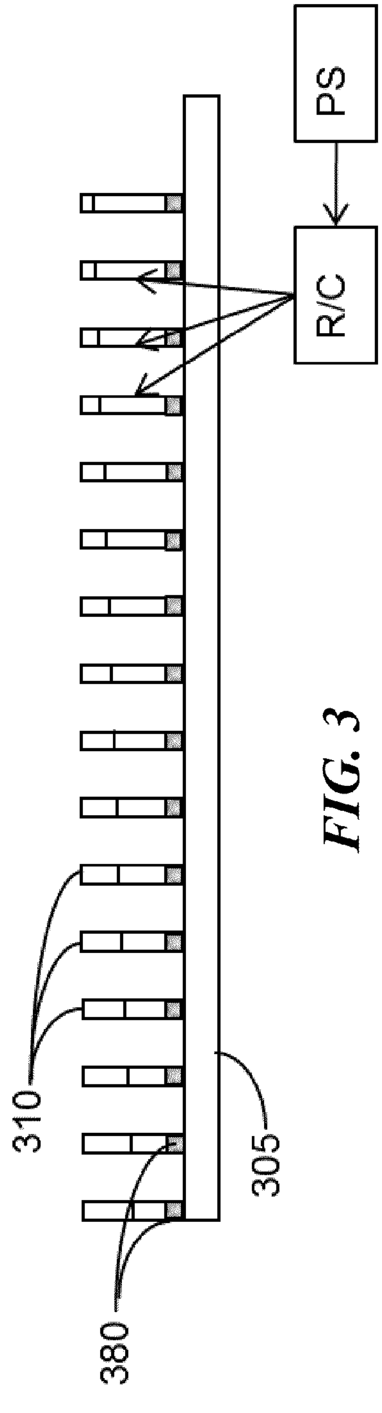
FIG. 3 illustrates an embodiment of an electrode that is designed to sustain DC gradient along the axis of the ion flow.

In the embodiments described above, no DC bias voltage is applied to the ion guide. Therefore, the entire electrode can be made integrated with the protruding elements, such as the fins, and the holder, such as the back plate, being machined from a conductive material. However in other embodiments of the present invention the electrodes could be constructed with insulating material in order to sustain a DC gradient (in volts/cm) between the entrance and exit of the ion guide. FIG. 3 illustrates an embodiment of an electrode (for a funnel) that is designed to sustain DC gradient along the axis of ion flow. In FIG. 3 the fins 310 are attached to the back plate 305 via an insulation layer 380. For example, the fins 310 can be adhered to the back plate 305 using insulating adhesive 380. Alternatively an insulation plate 380 may be inserted between the fins 310 and the back plate 305. The insulation plate may be made of, for example, polytetrafluoroethylene.

While in FIG. 3 all of the fins 310 are shown to be attached to the back plate 305 via insulation 380, this is not required. For example, the electrode can be made by machining it from a single piece of conductive material, but missing the first and the last fins 310, so that just the group of intermediate fins between the first and the last is machined integrally with the holder from a single block. The missing fins can be made separately from a conductive material and be attached to the back plate via an insulating material 380. In this embodiment, a DC bias is applied to the fins from a DC power source PS, via a resistive-capacitive network R/C. The DC bias is applied only to fins that are insulated from the back plate. Conversely, all of the fins of one electrode are coupled to the same RF power source for creating the pseudopotential confinement field.

As can be understood from the above description, opposite phase RF voltages are applied to adjacent electrodes to thereby produce the confinement field. In the example of FIG.

2A-C, only four identical electrodes are required to generate the quadrupolar confinement field. In the examples described herein there is an axis of symmetry along the flow axis, that is, 360/4=90 degrees for the quadrupolar funnel of FIG. 2A-C. Rotating the device of FIG. 2B by 90 degrees, one reproduces the same mechanical device with an inverse phase RF voltage. If one rotates the device of FIG. 2B by 360/2=180 degrees, one produces the same mechanical and electrical symmetry. This rotation degree corresponds roughly with the angular region covered by the arcuate cut in the fin aperture contour forming portion. The same principle can be applied to other embodiments, for instance, 360/2=180 degrees for dipole having two electrodes and 360/8=45 degrees for an octopole with eight electrodes.

Figure 4A:
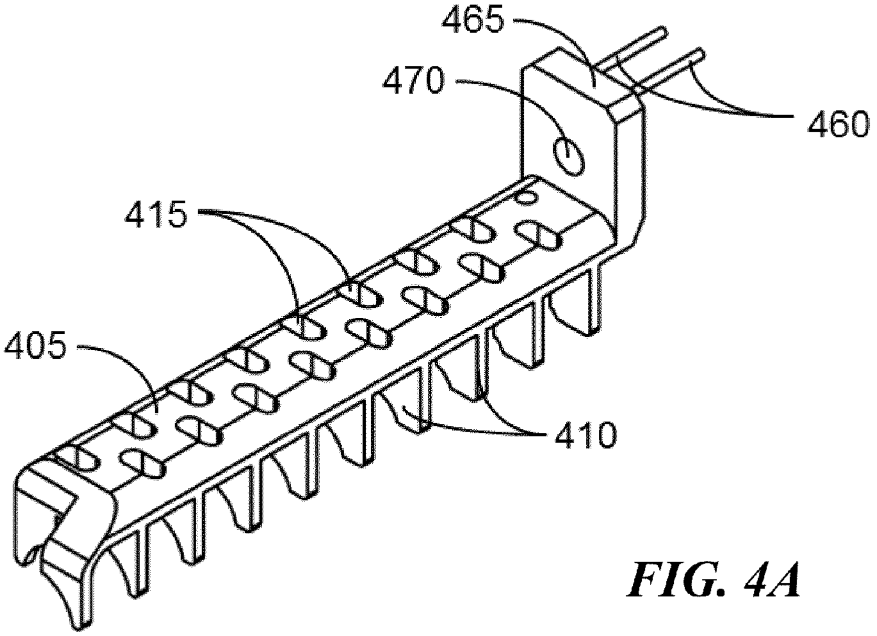
FIGS. 4A-C illustrate an embodiment of the invention wherein the electrodes comprise an attachment plate and are attached to a support plate.
Figure 4B:
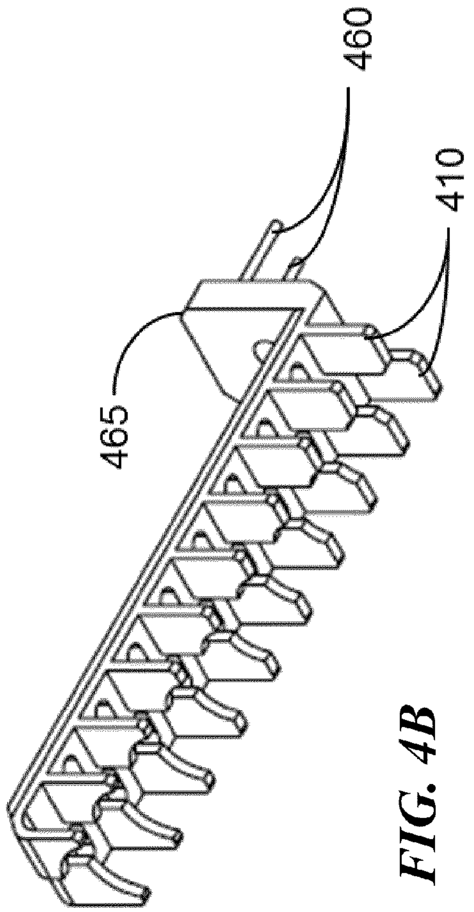
Figure 4C:
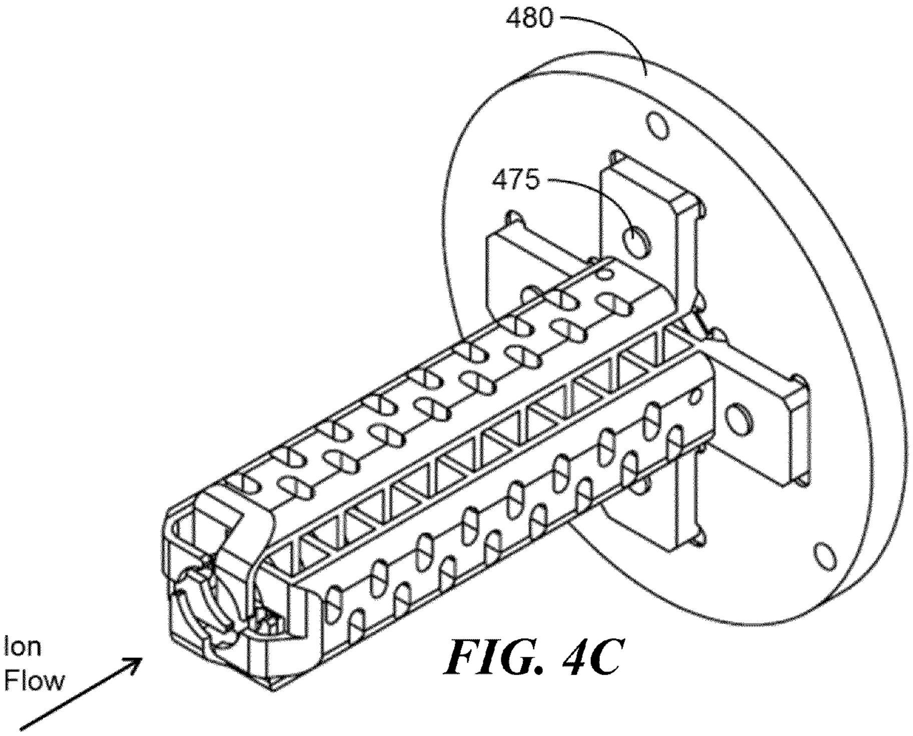

FIG. 4A-C illustrate an embodiment of the invention wherein the electrodes are attached to a support plate. In this example the electrodes are not physically connected to each other, but in other embodiments the electrodes can be connected to each other via, for example, an insulating adhesive or insulating supports. The electrodes of FIG. 4A-C are constructed similarly to the other embodiments described above, in that each electrode has a holder in the form of a back plate 405, a plurality of fins 410 as elements protruding therefrom, and a plurality of optional pumping holes 415. In this embodiment, an attachment plate 465 is fabricated at one end of each electrode. The attachment plate 465 can be made integrally to the back plate 405. The attachment plate may be fabricated with a hole 470 to enable attachment to support plate 480 using a bolt 475, as illustrated in FIG. 4C. Also, conductor pins 460 emanate from the attachment plate 465 such that, when the electrode is attached to the support plate 480 the pins 460 may function as "keys" to align the electrode in the proper orientation and also serve to couple to an AC/DC power source.

Figure 5A:
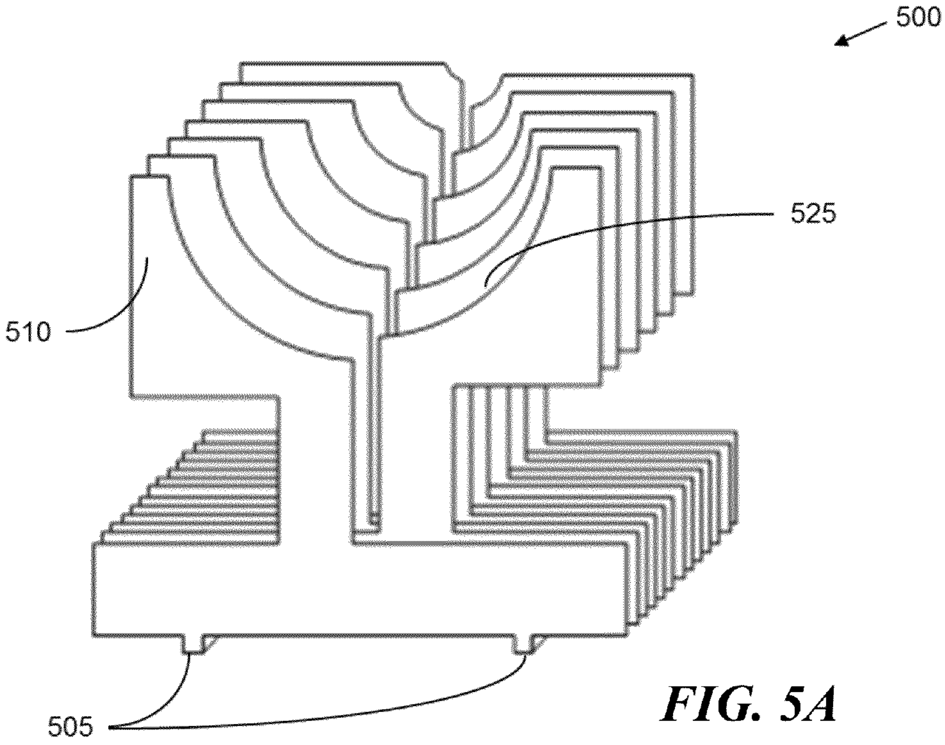
FIGS. 5A-B show a different design of the ion guide electrodes and the assembled ion guide.
Figure 5B:
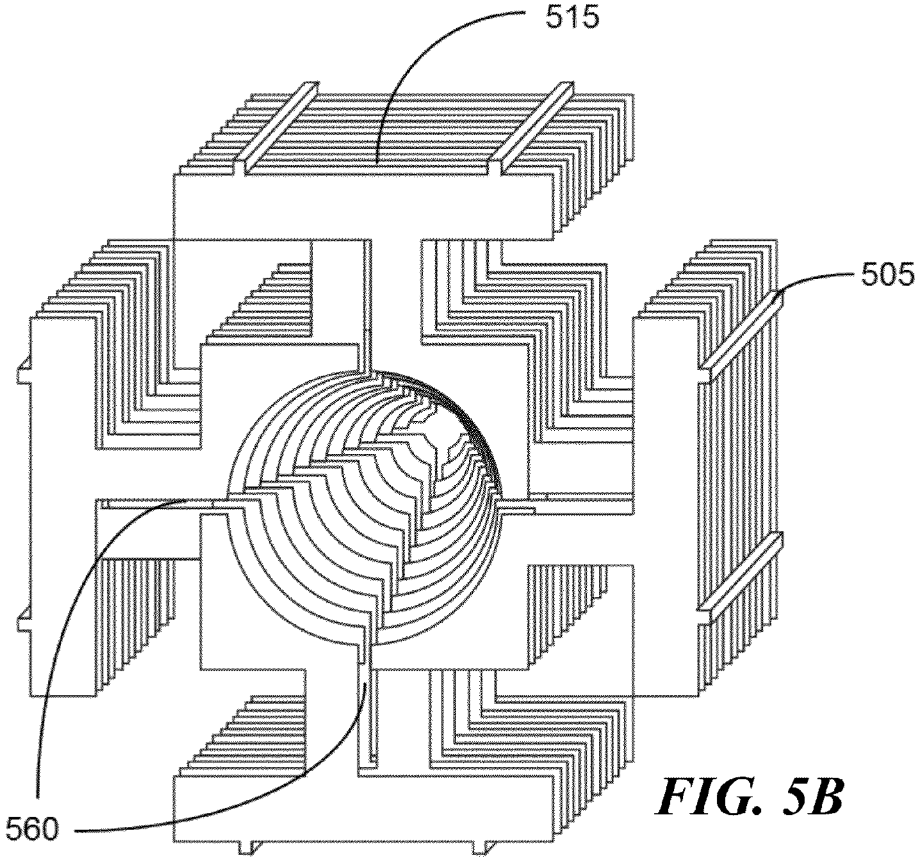

Another embodiment of an ion guide is illustrated in FIG. 5A-B. This embodiment likewise comprises four identical electrodes machined from a solid block and assembled around a common axis under rotational symmetry. One such machined electrode 500 is illustrated in FIG. 5A. Each of the four electrodes 500 comprises a holder in the form of two narrow bars 505. Due to the small dimension of the bars, the various openings 515 between the bars and the different protruding elements allow for efficient vacuum pumping. The electrode 500 also comprises a plurality of protruding elements which, owing to their shape, can be called "sickles" 510. The spacing, shape, and thickness of the sickles 510 co-define the radio frequency field and can be easily build into one single electrode. The aperture contour forming portion at the distal end of the sickles 510 comprises again a recessed outer contour portion in the form of an arcuate recess or cut 525. As a dimension of the arcuate cut 525 decreases along the row of sickles 510, the ion guide 500 illustrated serves as ion funnel. However, it is possible, without any undue effort, to alter the design towards a constant aperture to form an "ion tunnel".

In FIG. 5B, the assembled funnel is illustrated with the large central opening facing the reader, that is, showing the side that will be assembled facing the ion source. Therefore, the sickles 510 fully visible to the reader in FIG. 5B have the largest radius cut. The two adjacent rows of sickles 510 attached to the two bars 505 are parallel and axially shifted relative to each other such that a sickle 510 in one row is generally centered across a space between two adjacent sickles 510 in the other row. In this manner, upon assembly of the electrodes 500, equal spacing between the plane segmented aperture members formed by four coplanar sickles 510, which are separated by gaps 560, is created. It should be appreciated, however, that the centered arrangement is not strictly mandatory. Other spacings are also conceivable.

From the illustration of FIG. 5B it is apparent that, in this embodiment, the gaps 560 between the different cooperating sickles 510 are smaller than in the previously presented embodiments of FIG. 2A-C, for example. The smaller the gaps 560 are, the more homogeneous the radio frequency confinement fields, which improves the efficiency of the confinement and reduces ion loss. Of course, when choosing the gap dimension it must be ensured that the electrical insulation between the assembled electrodes 500 is not at risk. As the case may be, insulation may be guaranteed by spacers (not shown) made of an insulating material which fill the gaps.

The four electrodes 500 are preferably machined with the identical shape of features, that is, identical bars 505, sickles 510 and recesses 525. As before, the four identical electrodes 500 are assembled with respect to the features of an adjacent electrode, such that together the sickles 510 of the assembled electrodes form plane segmented aperture members (formed by the coplanar sickle "blades") with an aperture for ion transfer, wherein each successive aperture member, in an axial direction, has a smaller aperture in this example.

Figure 8:
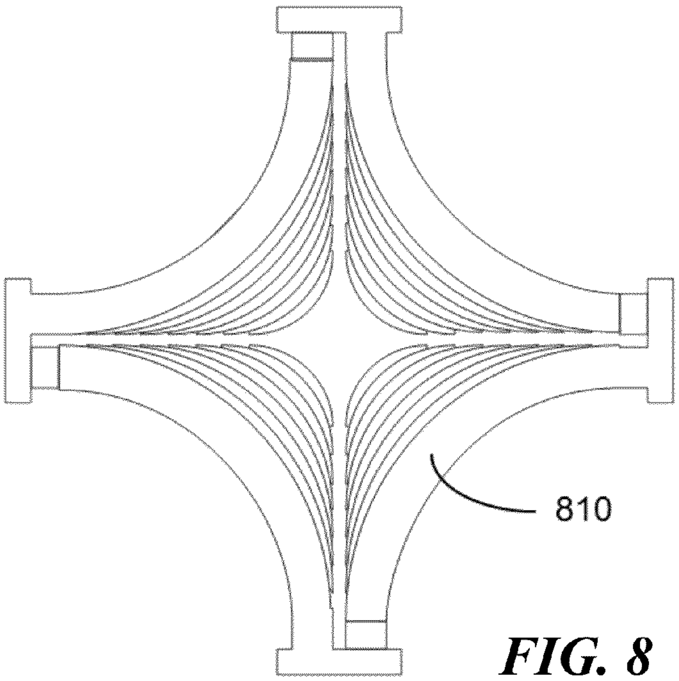
FIGS. 6, 7 and 8 show implementations of the protruding elements with different aperture contour forming portions.
Figure 7:
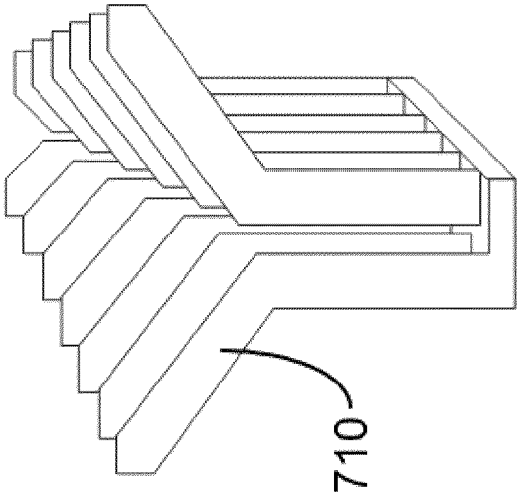
Figure 6:
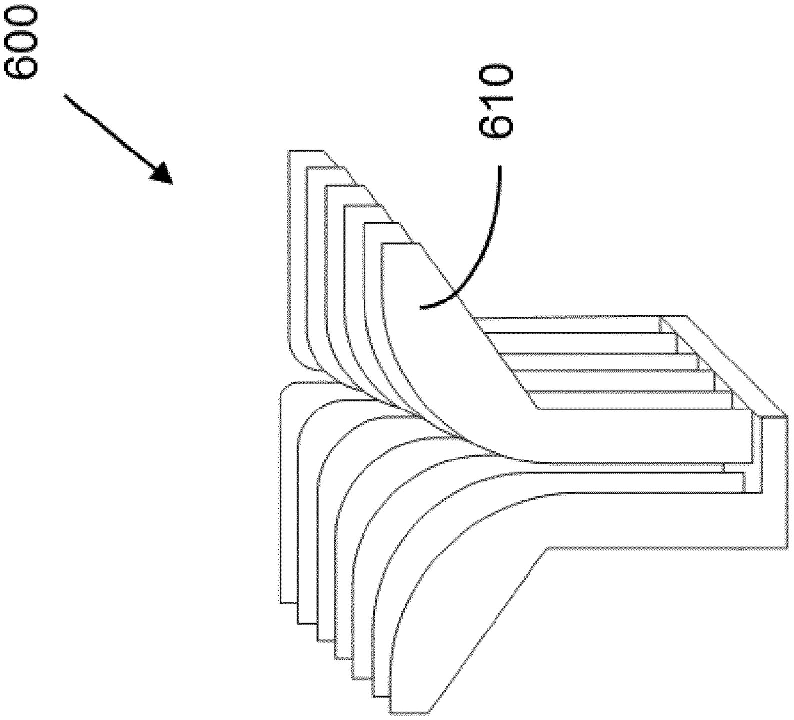

In the embodiments described above, the aperture contour forming portions all have recessed (or in other words concave) characteristics. However, this not mandatory. FIGS. 6, 7 and 8 show protruding elements that, at a distal end, rather have a bulged (or in other words convex) characteristic as aperture contour forming portion. FIG. 6, for example, shows an embodiment of an electrode 600 the protruding elements 610 of which roughly resemble the end of a "hockey stick". The hockey stick contour facing the ion optical axis, in particular, is characterized by its smoothness devoid of edges. In this manner, it is possible to realize hyperbolic electrode shapes such as are known from cross sections of some multipole rods in the prior art. The protruding elements 710 in the embodiment of FIG. 7, on the other hand, rather take the form of an angled bracket. The central aperture that is created upon assembly of a certain number of electrodes as shown in FIG. 7 then generally has a square shape. The gaps between cooperating hockey sticks or angled brackets, created upon assembly, again are favorably of small size and therefore allow for a rather homogeneous RF confinement field to be created. The list of embodiments with other than concave aperture contour forming portions also includes the design shown in FIG. 8 (here shown after assembly) wherein the protruding elements 810 of each electrode generally take the simple form of "circular arcs". Here, the inner width generally has a trapezoidal shape which, as shown, can narrow from one end of the assembled ion guide to the other end, and thereby constitute an ion funnel. However, it is to be appreciated that with all designs illustrated by way of example also ion tunnels with constant aperture can be realized.

Figure 1:
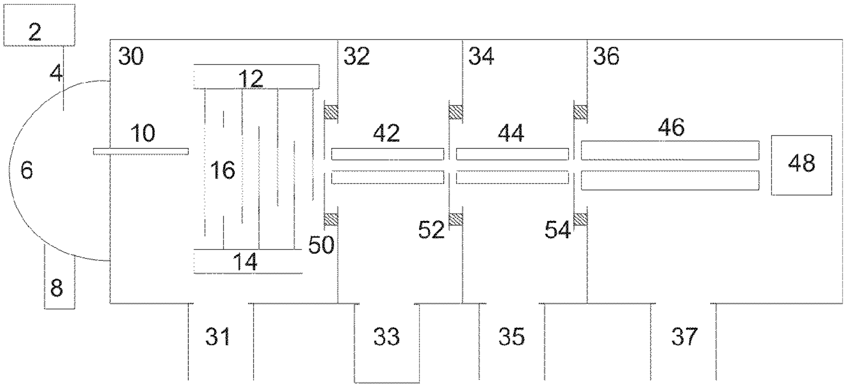
FIG. 1 (Prior Art)
FIG. 1 is a schematic of a mass spectrometer assembly according to prior art.
Figure 9:
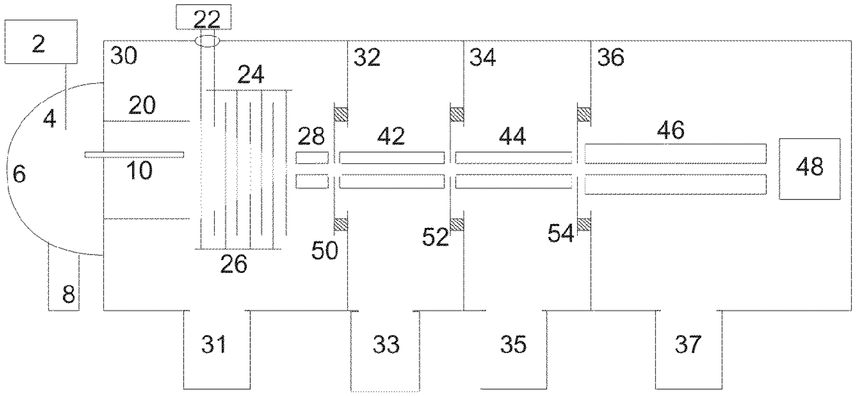
FIG. 9 shows a schematic of a mass spectrometer assembly wherein an ion guide according to the principles of the present invention is incorporated.

FIG. 9 shows an exemplary mass spectrometer arrangement that resembles that illustrated in FIG. 1 but has incorporated an ion guide (or ion funnel in this case) according to embodiments of the invention. Where appropriate, like elements in FIG. 1 and FIG. 9 are designated with like numerals. Furthermore, the following description focuses on the differences in the implementation of FIG. 9 compared to the implementation of FIG. 1.

The inlet capillary 10 is encased by a gas flow guiding cylinder 20 that allows for a better channeling of gas flows in the first vacuum chamber 30. A channeled gas flow may entrain ions and thereby provide a driving force for driving the ions through the funnel architecture, in particular when no DC potential gradient is established between the large aperture end and the small aperture end of the funnel.

Opposite the exit of the inlet capillary 10 is the ion funnel assembled according to embodiments of the invention. The ion funnel may have a quadrupolar design and therefore contains four electrodes of which two are designated with 24 and 26 in the planar view of FIG. 9. The ion guide according to embodiments of the invention is wired such that RF voltages are supplied to the aperture contour forming portions in an axially alternating manner (known from stacked ring ion guides) and, at the same time, in a cross-wise manner (known from multipole rod assemblies). In this embodiment, the RF generator 22 is located outside the vacuum regime. From there, leads are guided through a vacuum preserving feedthrough into the first vacuum chamber 30.

One advantage of the hybrid wiring of the ion guide according to embodiments of the invention is that another multipole ion guide (in FIG. 9 designated as 28) can be located at the exit end of the ion funnel. The additional multipole ion guide 28 is supplied with the same phase pattern of RF voltages as the ultimate plane segmented aperture member of the hybrid-wired ion funnel so that a smooth transition of RF fields exists between the ion funnel opposite the inlet capillary 10 and the ion guide 28. In this manner, any interference with the flow of ions from one ion guide to the other can be minimized thereby reducing ion loss. Furthermore, the additional ion guide 28 provides for more space upstream of the insulated orifice plate 50 at the interface between the first vacuum chamber 30 and the second vacuum chamber 32 for lateral gas pumping. The smaller the gas load on the second vacuum chamber 32 can be kept, the better.

Figure 10:
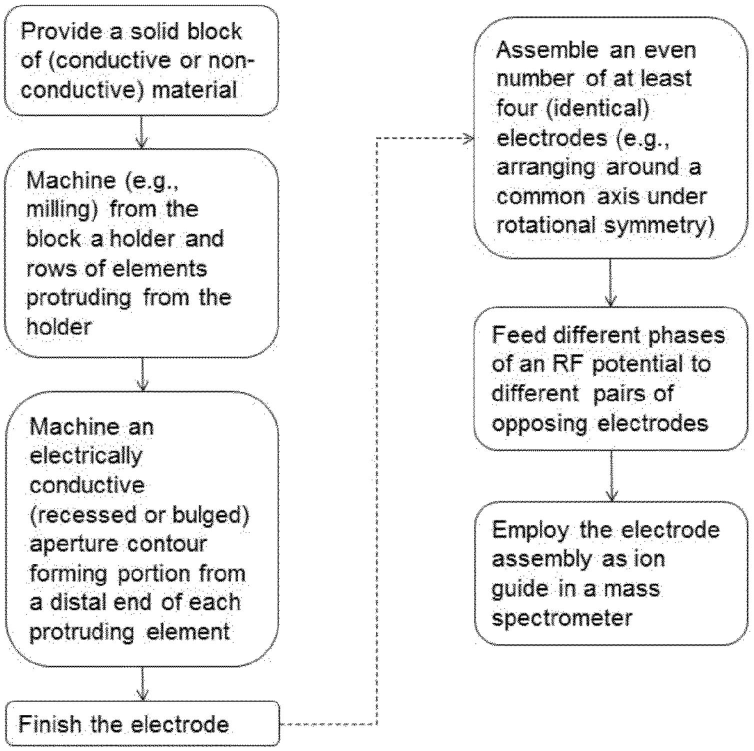
FIG. 10 is a flow diagram of how an electrode for an ion guide according to embodiments of the invention can be fabricated and put into use.

FIG. 10 shows a flow diagram of how an electrode for an ion guide according to embodiments of the invention can be fabricated and put into use in an electrode assembly constituting an ion guide.

As can be appreciated from the above description, embodiments of the invention enable a rather easy manufacturing, since the four electrodes are identical. The device can also be miniaturized and the electrical connection can be made easy, since the number of connections merely corresponds to the polarity of the ion guide, such as four for a quadrupolar ion guide, six for a hexapolar ion guide, etc., rather than individual connection to each ring electrode as is known from the prior art. The construction of the ion guide provides flexibility in the design of the radio frequency field, by simply shaping the features of the protruding elements, that is, thickness, spacing, and recess or bulge size. Also, since all of the protruding elements are attached, or made integral, to the holder, the precise spacing and positioning of the plane segmented aperture members is assured. Further, this design needs no DC field along the ion beam axis inside the ion guide. Axial ion propagation may be facilitated, for example, by a gas flow from the high pressure region at the upstream side, for example facing the ion source, to the low pressure region at the downstream side, for example facing the mass analyzer. The gaps between the segments of the plane segmented aperture members allow for electrical insulation among the different assembled electrodes.

In the embodiments described above, a quadrupolar ion guide is described, which is constructed by machining from a single block of material an electrode integrated with the feature, that is, fins in this example, that, together with complementary fins of complementary electrodes, co-define the radio frequency field and shape the central aperture of the ion guide. This construction is simple and inexpensive; however, it should be appreciated that the electrodes need not be machined integrated with the protruding elements, and that the protruding elements can be manufactured separately and then attached to a holder of the electrode. Also, while the assembly shown here comprises four electrodes, the ion guide according to embodiments of the invention can be made with more electrodes, for instance, six for a hexapole, eight for an octopole, etc. Moreover, while in the described embodiments the holder and protruding elements are machined from a single block of electrically conductive material, such as metal, they may also instead be machined from a single piece of insulating material which is then coated with a conductive material, favorably only at the aperture contour forming portions where the RF fields need to be created.

It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein.

The present invention has been described in relation to particular examples, which are intended in all respects to be illustrative rather than restrictive. Those skilled in the art will appreciate that many different combinations of hardware, software, and firmware will be suitable for practicing the present invention. Moreover, other implementations of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A radio frequency ion guide, comprising:

a plurality of electrodes, each of the electrodes having at least one row of elements protruding from a holder, each of the protruding elements, at a distal end, having an electrically conductive aperture contour forming portion;

a mechanism for assembling the electrodes so that rows of protruding elements cooperate to form a row of substantially plane segmented aperture members, each of the segmented aperture members having a plurality of insulating gaps located between cooperating protruding elements, and a central aperture defined by cooperating aperture contour forming portions.

2. The ion guide according to claim 1, wherein, in each of the plurality of electrodes, a dimension of the aperture contour forming portion changes from element to element along the at least one row of protruding elements, so that when the rows of protruding elements of the plurality of electrodes cooperate, a dimension of the central aperture generally decreases along the row of segmented aperture members.

3. The ion guide according to claim 1, wherein each electrode at one end comprises an attachment plate, via which the each electrode is coupled to a support plate.

4. The ion guide according to claim 1, wherein in each of the plurality of electrodes the holder comprises a plurality of pumping apertures therethrough.

5. The ion guide according to claim 1, wherein each row of protruding elements comprises a first protruding element, a last protruding element, and a group of intermediate protruding elements, and wherein in each of the plurality of electrodes the holder and at least the group of intermediate protruding elements are machined integrally from a single piece of conductive material.

6. The ion guide according to claim 5, wherein the first protruding element and the last protruding element are mechanically attached to, and electrically insulated from, the holder and supplied with radio frequency and direct current potentials separate from radio frequency and direct current potentials applied to other protruding elements.

7. The ion guide according to claim 1, wherein, in each of the plurality of electrodes, the plurality of protruding elements are arranged in two parallel rows on the holder, wherein one row is shifted spatially in an axial direction, such that the protruding elements in one row are located across a space between two protruding elements in the other row.

8. The ion guide according to claim 7, wherein the protruding elements in one row are centered across the space between two protruding elements in the other row.

9. The ion guide according to claim 1, wherein the protruding elements of each segmented aperture member cooperate to form opposing pairs, the opposing pairs being configured to receive different phases of a radio frequency potential.

10. The ion guide according to claim 1, wherein the protruding elements of the segmented aperture members are substantially aligned along a common axis along the row, each protruding element in one segmented aperture member receiving a different phase of radio frequency potential than the protruding elements in adjacent segmented aperture members aligned therewith.

11. The ion guide according to claim 1, wherein all electrodes are identical and assembled around a common longitudinal axis with rotational symmetry.

12. An apparatus for performing mass spectrometry comprising:

an ion source;

a mass analyzer; and an ion guide having a plurality of electrodes, each of the electrodes having at least one row of elements protruding from a holder, each of the protruding elements, at a distal end, having an electrically conductive aperture contour forming portion and a mechanism for assembling the electrodes so that rows of protruding elements cooperate to form a row of substantially plane segmented aperture members, each of the segmented aperture members having a plurality of insulating gaps located between cooperating protruding elements, and a central aperture defined by cooperating aperture contour forming portions, the ion guide having an inlet end coupled to the ion source and an outlet end coupled to the mass analyzer, and being configured for guiding ions from the ion source to the mass analyzer, wherein the ion source is maintained at a pressure higher than the mass analyzer.

13. An electrode for a radio frequency ion guide, comprising:

a holder;

a plurality of protruding elements extending in at least two adjacent rows from the holder, each of the rows having a first protruding element, a last protruding element, and a group of intermediate protruding elements and each of the protruding elements, at a distal end, has an electrically conductive aperture contour forming portion, and wherein the holder and at least the group of intermediate protruding elements are machined integrally from a single piece of conductive material.

14. The electrode of claim 13, wherein, in each row, the first protruding element, the last protruding element, and the group of intermediate protruding elements together with the holder are machined integrally from a single piece of conductive material.

15. The electrode of claim 13, wherein the first protruding element and the last protruding element are mechanically attached to, but electrically insulated from, the holder.

16. The electrode of claim 13, wherein the protruding elements have the shape of fins, and the aperture contour forming portion is a recessed outer contour portion at a distal end of the fins.

17. The electrode of claim 13, wherein the holder is a back plate.

18. The electrode of claim 17, wherein the back plate comprises a plurality of pumping apertures.

19. The electrode of claim 13, wherein the plurality of protruding elements is surface treated to provide chemical resistance.

* * * * *